United States Patent [19]

Angst

[11] 4,195,446
[45] Apr. 1, 1980

[54] APPARATUS FOR THE CONTROL OF A TOOL IN A GEAR PROCESSING MACHINE

[75] Inventor: Arthur Angst, Wil, Switzerland

[73] Assignee: Reishauer AG, Zurich, Switzerland

[21] Appl. No.: 946,469

[22] Filed: Sep. 28, 1978

[30] Foreign Application Priority Data

Oct. 4, 1977 [DE] Fed. Rep. of Germany ....... 2744562

[51] Int. Cl.² .............................................. B24B 49/08
[52] U.S. Cl. ........................... 51/105 GG; 51/165.71; 51/123 G;; 73/37.5
[58] Field of Search ............ 51/165.71, 95 R, 95 GH, 51/105 R, 105 GG, 123 G; 73/37.5, 37.6

[56] References Cited

U.S. PATENT DOCUMENTS

| | | | |
|---|---|---|---|
| 3,052,974 | 9/1962 | Williams | 73/37.5 |
| 3,443,341 | 5/1969 | Honda | 51/105 G |
| 3,863,493 | 2/1975 | Busenkell | 73/37.5 |
| 3,906,677 | 9/1975 | Gunter | 51/123 G |

*Primary Examiner*—Harold D. Whitehead
*Attorney, Agent, or Firm*—Sughrue, Rothwell, Mion, Zinn and Macpeak

[57] ABSTRACT

The present invention relates to an apparatus and a process for a gear processing machine operating according to the screw rolling process principle and with positive control of the movement of a rotating tool in the prearranged toothing of the workpiece rotating with respect to the tool.

6 Claims, 15 Drawing Figures

APPARATUS FOR THE CONTROL OF A TOOL IN A GEAR PROCESSING MACHINE

BACKGROUND OF THE INVENTION

In the case of grinding machines for the flanks of teeth which operate by way of the screw rolling process and which have a rigid gear train between a grinding worm and a workpiece upon which gear teeth are to be formed or have a synchronous drive of the grinding worm and the workpiece, the bringing of the grinding worm into engagement with the workpiece takes place generally while the tool and the workpiece spindle is at a standstill, i.e. visually and by hand.

In a known construction as seen in German Pat. No. 883,551 engagement of the grinding worm with the workpiece on machines for producing gear teeth by grinding, which is activated via two synchronous motors, takes place not by turning off the driving motors of the grinding worm and the workpiece in case of a change of the workpiece, but only by uncoupling the driver of the workpiece. The new workpiece must again be clamped onto the clamping mandrel in precisely the same position in relation to a tooth space, as the previous gear. This clamping process may, as is self evident, also be used in case of gear tooth grinding machines which have a rigid gear train between the grinding worm and the workpiece.

In another prior art construction, as in German Pat. No. 1,286,883 locally fixed positioners, connected with the machine operate a phase shifter, which rotates one of two synchronous motors. The workpiece however, must be indexed at the same time, that is it must be clamped in a fixed position.

In the case of another known gear tooth grinding machine U.S.S.R. Pat. No. 200,394, inductive transmitters are provided for the determination of the position of the tool and workpiece for the purpose of automatic adjustment of one or several speeds of the grinding worm in which these transmitters are connected to a phase meter. The phase meter is connected to an adjusting motor via an electric amplifier. The motor causes an axial shift of the grinding disc into synchronism with the speed of the grinding worm and the tooth gap of the workpiece. The workpiece, in order to simplify the construction of the workpiece transmitter, is inserted into its electromagnetic circuit in such a way that it serves as a rotor while the stator is made in the manner of exchangeable tooth sectors which must always correspond with the teeth of the gear that is to be processed.

In order to be able to equip gear tooth grinding machines which operate in the screw rolling process with a grinding worm, for economic reasons, neither moving of the grinding worm by hand nor an alignment of the workpiece on a clamping mandrel for the purpose of maintaining the position of the teeth of the workpieces may be used. The solution to the problem according to the referenced U.S.S.R. patent is to use gears which may be energized electromagnetically. According to this proposal however, exchangeable tooth sectors are required which must always coincide with the toothing of the gear to be processed.

SUMMARY OF THE INVENTION

It is the object of the invention to create a device of the above-mentioned kind which makes possible automatic insertion of a tool rotating at a forced speed which may be used on gear processing machines with electronic control in which the required correctional movement is carried out by additional rotational movement of the workpiece. However, it should also be possible to use gear processing machines which have a rigid gear train between the tool and the workpiece or have synchronous drive of the tool and the workpiece. In such a case, the correctional shift is accomplished by the axial shifting of the tool. Furthermore, apparatus so constructed is also suitable for the processing of workpieces of any working material, thus, for example, also of electrically non-magnetizable materials.

For the solution of this task, the invention is characterized in that during the movement of the tool and of the workpiece prior to engagement, their respective position is measured by means of determining the positions relative to a fixed predetermined reference line, whereby in case of measurements extending over a certain number of successive tooth or speed spacings, a mean value is determined. For the approach of the reference line up to engagement, a correction is made according to the measurement or to the mean value of the measurement by an axial shift of the tool or by an additional rotation of the workpiece in the corresponding directional sense.

The respective position of the tool and workpiece is measured advantageously by a determination of the distance of the centerline of a tooth of the workpiece from the centerline of a gap of the tool.

According to the invention, the apparatus is characterized by a measurement transmitter which may be positioned between the tool and workpiece during operation of the tool and workpiece prior to engagement. The transmitter is adapted for the measurement of pneumatic differential pressure and has one pair of nozzles for each of the tool and the workpiece, whereby each pair of nozzles comprises an adjustable reference nozzle and a measuring nozzle which may be aligned with the tool or the workpiece. The measuring nozzle produces an electric signal corresponding to the measured differential pressure. A detection circuit is connected to the measuring nozzles for detecting movement of the tool gaps and teeth of the workpiece past the measuring nozzles. A first logical circuit is connected to the detection circuit which is connected with switching means for producing measurement pulses, the frequency of which is higher than the frequency of successive tooth or speed spacings. A counter is provided connected to the output of the first logical circuit for the algebraic summation of measuring pulses controlled by the starting signals of the detection circuit depending on the logical circuit, as well as a second logical circuit for the formation of correction signals in forward and backward directions depending on the content of the counter.

Embodiments of the apparatus of the invention are explained subsequently with reference to the drawings. This explanation is made with reference to a gear tooth grinding machine which operates using the screw rolling process, i.e. with a grinding worm. Of course the present process and apparatus may also be used for the hobbing of pre-toothed gears on a hobbing machine.

DESCRIPTION OF THE PREFERRED EMBODIMENTS

In order to achieve engagement of the preprocessed teeth on the gear to be ground (which is moved manually or by means of an automatic charger on the grinding machine in to a clamped-down position) with the gap of the grinding worm, it is necessary in the presently described embodiment of the invention, that first the distance of the centerline of the workpiece tooth on the rotating gear closest to the gap of the grinding worm must be determined. As a starting point for the measurement of the mean distance of the workpiece tooth, one may, for example, advantageously select the starting point of the gap of the grinding worm on the head cylinder of the similarly rotating grinding worm.

The measurement is accomplished in case of the present embodiment with two measuring nozzles used one at a time, one of which is directed toward the head cylinder of the grinding worm, the other toward the head cylinder of the workpiece. The teeth and the gaps between teeth moving past the measuring nozzles cause corresponding changes in pressure. In practice the pressure is not going to rise or drop absolutely abruptly at the beginning or the end of the teeth. The width of the teeth and of the gaps shown in FIGS. 1A to 1H are therefore shown schematically. In principle, they represent the signals delivered by the measuring nozzles, and not the actual width of the teeth and the gaps on the head cylinder.

In FIGS. 1A to 1H cases of correspondence of teeth of workpieces to the gaps of the grinding worm, or cases of correspondence of the signals produced by the above-mentioned measuring nozzles of the grinding worm and of the workpiece gear are shown.

Figure 1A:
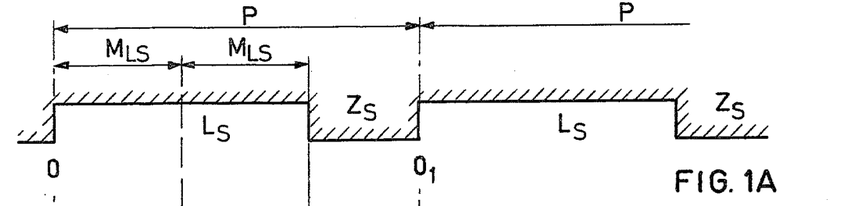
FIG. 1A shows schematically and by cross-sectional views a grinding worm.
Figure 1B:
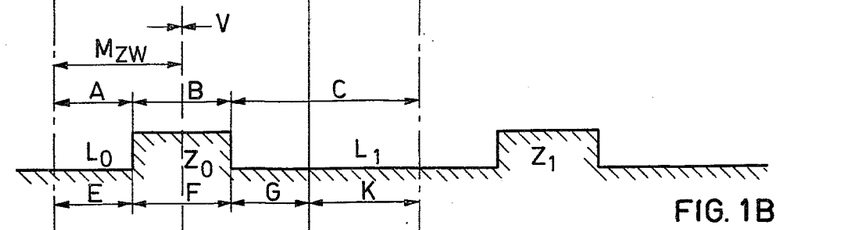
FIGS. 1B to 1E show schematically and by cross-sectional views four cases of teeth of workpieces in relation to the grinding worm of FIG. 1A at the beginning of the present process.
Figure 1C:
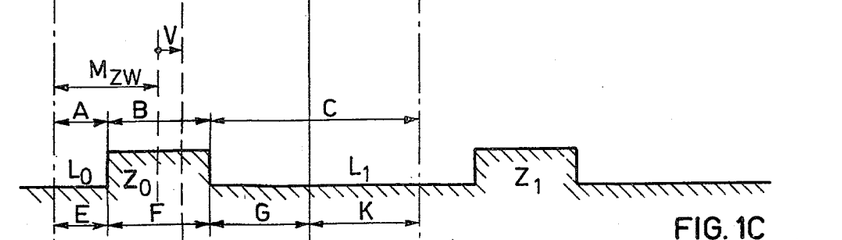
Figure 1D:
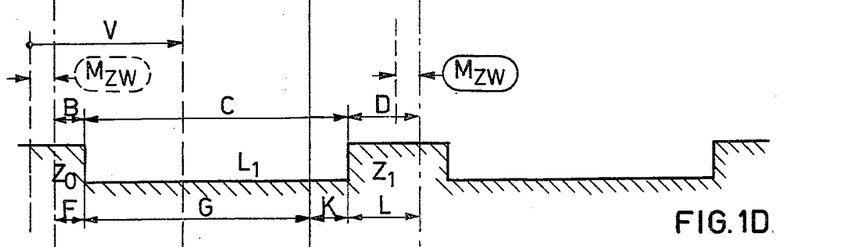
Figure 1E:
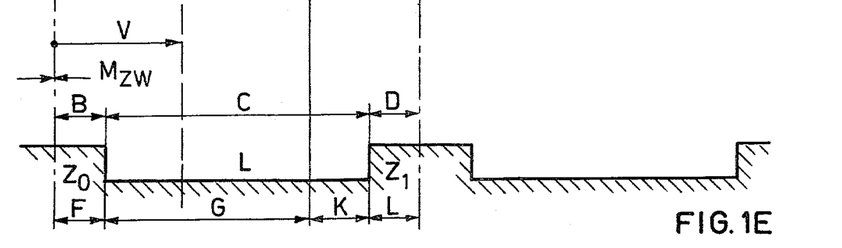
Figure 1F:
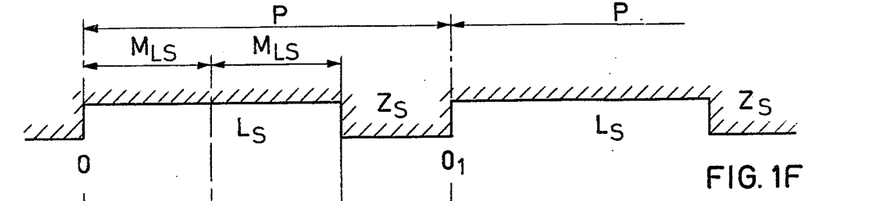
FIG. 1F shows a grinding worm as in FIG. 1A.

In the FIGS. 1A and 1F, referring to the grinding worm, P designates the tooth spacing which comprises one tooth gap $L_S$ and one tooth $Z_S$. The distance between centerlines of the gap $L_S$ of the grinding worm is designated by $M_{LS}$. In all FIGS. 1A to 1H the limits of the tooth spacings P of the grinding worm are drawn with perpendicular dash-dot lines and the centerlines of the tooth gaps $L_S$ with perpendicular broken lines.

In FIGS. 1B to 1E as well as 1G and 1H, six workpiece gears corresponding to the grinding worms of FIGS. 1A and 1F are shown which always comprise a first tooth gap $L_0$, a first tooth $Z_0$, a successive tooth gap $L_1$ and a successive tooth $Z$, as well as additional tooth gaps and teeth which are not herein shown.

Furthermore, successive sections of the workpiece, lying within a tooth spacing P of the grinding worm have been indicated in the FIGS. 1B to 1E, 1G and 1H, namely:

A the portion of the width of the tooth gap $L_0$ within the tooth spacing P,

B the portion of the width of the tooth $Z_0$ within the tooth spacing P,

C the portion of the width of the tooth gap $L_1$ within the tooth spacing P, and D the portion of the width of the tooth $Z_1$ within the tooth spacing P.

It is easy to see, that the distance $M_{ZW}$ of the middle of the tooth of the workpiece from the above-mentioned reference point 0 at the beginning of a tooth gap $L_S$ of the grinding worm may be determined in all cases on the basis of the formula $$M_{ZW} = A + (B - D)/2. \tag{1}$$

In this case, the centers of teeth of the workpieces are also indicated in the FIGS. 1B to 1E, 1G and 1F by perpendicular, broken lines.

In order to achieve engagement of the teeth of the workpiece with the gaps of the grinding worm, the workpiece and the grinding worm must be shifted reciprocally by the amount of shifting V, shown in FIGS. 1B to 1E, 1G, 1H, prior to insertion of the rotating grinding worm into the likewise rotating workpiece. The amount of shifting V corresponds to the distance of the center of the tooth of the workpiece from the middle of the gap of the grinding worm. Since the reference point 0, for the purpose of determining the measurement, had been placed on the edge of the gap of the grinding worm as already mentioned, the amount of shifting V may be determined simply by the relation:

$$V = M_{LS} - M_{ZW}. \tag{2}$$

Advantageously, the measurement may be accomplished by counting measuring pulses, which are always produced in the area of the teeth and tooth gaps of the grinding worm and of the workpiece moving past the measuring nozzles. As a result of an algebraic summing up of such measuring pulses, one may obtain a balance for each tooth spacing P of the grinding worm, which corresponds to the amount V of shifting. It will be of advantage in this case, if the measuring pulses are produced in dependence on the rotational speed of the workpiece and particularly if they are deduced from the pulses of a shaft encoder. With $f_M$ the frequency of the measuring pulses and $f_W$ the frequency of the workpiece pulses recorded with the shaft encoder on the workpiece, then in the simplest case:

$$f_M = f_W = (\omega_W \cdot N_W)/2\pi \tag{3}$$

where $\omega_W$ is the angular velocity of the workpiece and $N_W$ the number of pulses per revolution of the workpiece, as taken from the shaft encoder on the workpiece. The frequency $f_M$ of the measuring pulses however, may also be the frequency $f_W$ of the workpiece pulses, multiplied by a certain factor, or in case of measurement over several tooth spacings P of the grinding worm, described subsequently, the frequency $f_W$ of the workpiece pulses divided by the number of tooth gaps.

In order that the algebraic summing of the measuring pulses produced by tooth spacings P may produce a balance for all possible cases of the alignment of the teeth of the workpieces with the gaps of the grinding worm, corresponding to the shifting of the workpiece required for the approach and alignment of the centerlines in relation to the grinding worm, the balance must be formed according to a certain pattern dependent on each case of alignment. The relative positions of sections of the workpiece in relation to a tooth spacing P of the grinding worm are shown in FIGS. 1B to 1E, 1G and 1H and are designated as follows:

Section E: gap $L_0$ inside gap $L_S$
Section F: tooth $Z_0$ inside gap $L_S$
Section G: gap $L_1$ inside gap $L_S$
Section H: tooth $Z_1$ inside gap $L_S$
Section I: gap $L_0$ inside tooth $Z_S$
Section J: tooth $Z_0$ inside tooth $Z_S$
Section K: gap $L_1$ inside tooth $Z_S$
Section L: tooth $Z_1$ inside tooth $Z_S$ Depending on whether a gap or a tooth of the workpiece of the gap or tooth of the grinding worm leads or lags, the measuring pulses must be summed with a minus or plus sign for the formation of the balance. Also, it must be taken into consideration whether or not in case of this leading or lagging of the gap or the tooth of the workpiece which corresponds to the respective tooth spacing P of the grinding worm and to the leading or lagging gap or to the leading or lagging tooth of the workpiece. In these cases, the measuring pulses must be added up with double the frequency of the measuring pulses. Thus the following counting pattern of measuring pulses results for the formation of the balance:

Section E: $L_0$ inside $L_S$: $-f_M/2$
Section F: $Z_0$ inside $L_S$: 0
Section G: $L_1$ inside $L_S$: $+f_M/2$
Section H: $Z_1$ inside $L_S$: $+f_M$
Section I: $L_0$ inside $Z_S$: $-f_M$
Section J: $Z_0$ inside $Z_S$: $-f_M/2$
Section K: $L_1$ inside $Z_S$: 0
Section L: $Z_1$ inside $Z_S$: $+f_M/2$ Whenever a tooth $Z_0$ of the workpiece coincides wholly or partly with a gap $L_S$ of the grinding worm and their centerlines coincide, or correspondingly, the centerline of the succeeding gap $L_1$ of the workpiece coincides with the centerline of the succeeding tooth $Z_S$ of the grinding worm, the relative position of the grinding worm is correct for sections F and K of the workpiece so that no measuring pulses contributing to the corrective shift need be counted.

Subsequently, numerical examples for calculating the center distance $M_{ZW}$ of a workpiece tooth from the starting point 0 of the pertinent gap of the grinding worm, the distance of the centerlines of the tooth of the workpiece to the gap of the grinding worm corresponding to the corrective shaft V of the workpiece in the case of measuring using a single tooth spacing P, as well as of the balance of the counting of the measuring pulses which correspond to the stated corrective shift V are listed. The examples are given for the cases of alignment shown in FIGS. 1A to 1H in which the values used are linear on the abscissa of the figures which may represent pulses, times or paths. Therefore, they may be shown as linear measurements i.e., they may be measured directly from the figures with due consideration of the scale. The following values were used as measures of reference for the scale:

P = 100 units
$M_{LS}$ = 35 units

Case 1 of Correlation FIGS. 1A and 1B

In this case the centerlines of the gap $L_S$ of the grinding worm and of the tooth $Z_0$ of the workpiece coincide. The centerlines spacing $M_{ZW}$ corresponds exactly to half the width of the gap of the grinding worm or to the distance $M_{LS}$ of the gap center measured from the same point of reference 0.

In this case:
A = 21 units
B = 28 units
C = 51 units
D = 0.

With the use of formula (1), the distance between centerlines $M_{ZW}$ is:

$$M_{ZW} = 21 + (28-0)/2 = +35$$

and according to the relation (2) for the corrective shift V:

$$V = 35 - 35 = 0$$

The same result is obtained from the summing up of the measuring pulses in sections, E, F, G and K, whereby
E = 21 units
F = 28 units
G = 21 units
K = 30 units, namely
$V = -21 f_M/2 + 0 + 21 f_M/2 + 0 = 0 f_M$.

Case 2 of Correlation, FIGS. 1A and 1C

Here the tooth $Z_0$ of the workpiece is completely within the area of the gap $L_S$ of the grinding worm. However, the centerline of the tooth of the workpiece does not coincide with the centerline of the gap of the grinding worm.

In this case:
A = 15 units
B = 28 units
C = 57 units
D = 0
E = 15 units
F = 28 units
G = 27 units
K = 30 units
Thus:
$M_{ZW} = 15 + (28-0)/2 = +29$
$V = 35 - 29 = +6$
$V = -15 f_M/2 + 0 + 27 f_M/2 + 0 = +6 f_M$.

Case 3 of Correlation, FIGS. 1A and 1D

Here the tooth $Z_0$ of the workpiece is not completely inside the gap $L_S$ of the grinding worm. The distance between centerlines $M_{ZW}$ of the tooth of the workpiece is measured from the next point of reference $0_1$, shifted by a tooth spacing P (tooth $Z_1$ of the workpiece). In fact, the distance between centerlines $M_{ZW}$ with regard to the reference point 0 of the beginning of the gap $L_S$ of the grinding worm is negative as shown in FIG. 1D.

Thus the measured distance between centerlines $M_{ZW}$ is given a minus sign.

In case of this example:
A=0
B=8 units
C=72 units
D=20 units
F=8 units
G=62 units
K=10 units
L=20 units
Thus:
$M_{ZW} = 0 + (8-20)/2 = -6$
$V = 35 - (-6) = +41$
$V = 0 + 62 f_M/2 + 0 + 20 f_M/2 = +41 f_M$.

Case 4 of Correlation, FIGS. 1A and 1E

The tooth $Z_0$ of the workpiece here is precisely on the edge of the gap $L_S$ of the grinding worm with its centerline on the point of reference 0.

In case of this example:
A=0
B=14 units
C=72 units
D=14 units
F=14 units
G=56 units
K=16 units
L=14 units
Thus:
$M_{ZW} = 0 + (14-14)/2 = 0$
$V = 35 - 0 = +35$
$V = 0 + 56 f_M/2 + 0 + 14 f_M/2 = +35 f_M$.

Figure 1G:
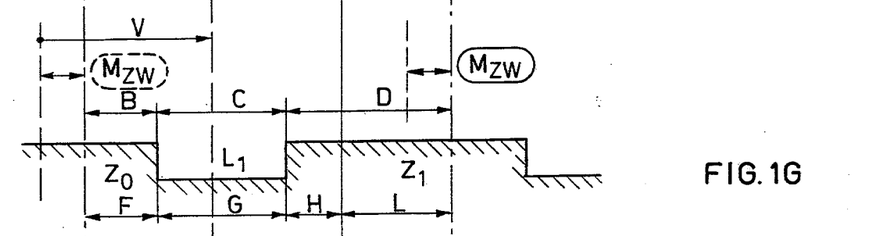
FIGS. 1G–1H show schematically and by cross-sectional views two more cases of teeth of workpieces in relation to the grinding worm of FIG. 1F.

Case 5 of Correlation, FIGS. 1F and 1G

Here the tooth of the workpiece is very broad or the workpiece delivers a very long output signal so that there exists alignment of the tooth $Z_0$ or $Z_1$ of the workpiece and of successive gaps $L_S$ of the grinding worm. As in Case 3 (FIGS. 1A and 1D), the distance between centerlines $M_{ZW}$ of the tooth of the workpiece is measured from the next reference point $0_1$ shifted by one tooth spacing P (tooth $Z_1$ of the workpiece) and is negative.

In case of this example:
A=0
B=20 units
C=34 units
D=46 units
F=20 units
G=34 units
H=16 units
L=30 units
Thus:
$M_{ZW} = 0 + (20-46)/2 = -13$
$V = 35 - (-13) = +48$
$V = 0 + 34 f_M/2 + 16 f_M + 30 f_M/2 = +48 f_M$.

Figure 1H:
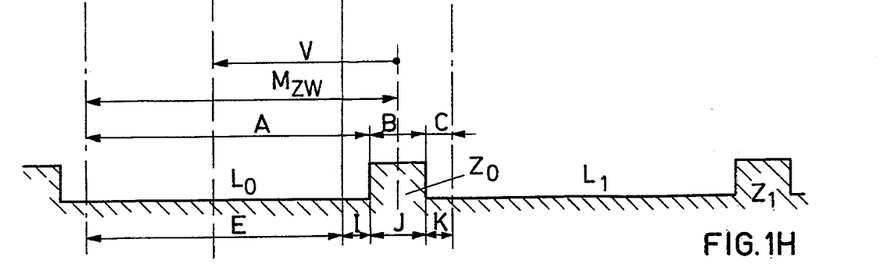

Case 6 of Correlation, FIGS. 1F and 1H

The tooth $Z_0$ of the workpiece here is very narrow or the workpiece delivers a very short output signal so that there is an overlap of the gap $L_0$ of the workpiece with the tooth $Z_S$ of the grinding worm.

In case of this example:
A=78 units
B=14 units
C=8 units
D=0
E=70 units
I=8 units
J=14 units
K=8 units
Thus:
$M_{ZW} = 78 + (14-0)/2 = +85$
$V = 35 - 85 = -50$
$V = -70 f_M/2 - 8 f_M - 14 f_M/2 + 0 = -50 f_M$.

The negative sign for the corrective shift V indicates that the shift takes place in reverse direction.

As mentioned, the measurement of the distance between centerlines of the gap of the grinding worm and the tooth of the workpiece, and the determination of the required corrective shift are made advantageously in the form of a count of the measuring pulses. For the algebraic summing operation, a logical switching circuit described below may be provided. The precision of the measurement by means of measuring nozzles of a measurement transmitter unit depends above all on the precision of the form of the widths of the teeth or the bevellings of the teeth. In order to eliminate this influence as much as possible, the measurement may be made using a greater, freely selectable and adjustable number of tooth spacings P for which the mean value is formed using this greater number. The formation of the mean value may be carried out such that the deviations of the centerlines of the workpieces and the gaps of the grinding worms determined per tooth spacing, are summed algebraically with a pulse frequency $f_M$ which is as many times smaller than the pulse frequency $f_W$ of the workpiece as tooth spacings counted. As a result of this, it will become possible to keep the size of a dual counting system small and as a result the costs low. The mean value determined in this manner corresponds to a mean corrective shift $V_M$ to be carried out in the corresponding magnitude and direction by an axial shift of the grinding worm or by an additional rotary movement of the workpiece.

Figure 2:
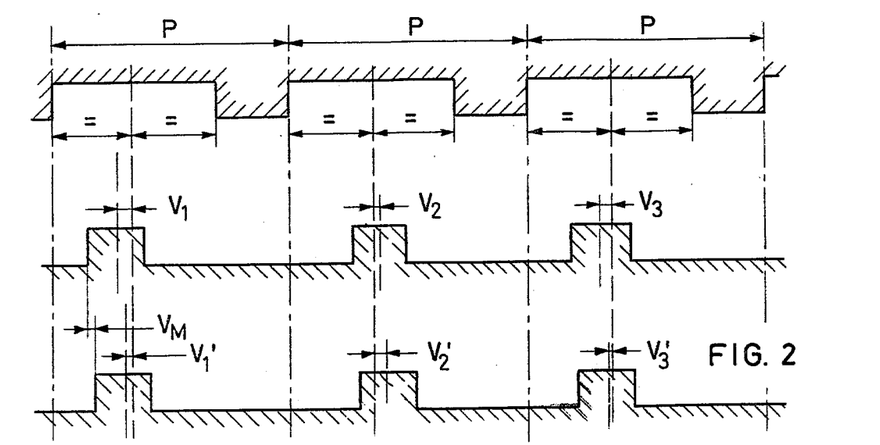
FIG. 2 shows schematically the determination of the mean value of the measurements via three tooth spacings or three teeth of a workpiece, i.e. the position of three workpiece teeth, relative to the position of the teeth of the grinding worm prior to and after a correctional shift.

The formation of the mean value for the corrective shift $V_M$ from the measurements by way for example of three tooth spacings P of the grinding worm is shown in FIG. 2. The measured deviations of the centerlines are designated by $V_1$, $V_2$ and $V_3$. The mean value $V_M$ is determined from:

$$V_M = (V_1 + V_2 + V_3)/3$$

An axial shift of the grinding worm or an additional rotation of the workpiece by this mean value $V_M$ is carried out depending on the kind of construction of the grinding machine which is shown in FIG. 2 at the bottom of the figure. The deviations of the centerlines after the corrective shift by the mean value $V_M$ have been designated correspondingly by $V_1'$, $V_2'$ and $V_3'$.

In case of gear grinding machines which are provided with a rigid gear connection between the grinding worm and the workpiece, as well as in case of grinding machines which are actuated by a single synchronous motor, the corrective shift $V_M$, because of the lack of means for the execution of an additional movement of rotation of the workpiece, is accomplished by an axial shift of the grinding worm. For this purpose, the grinding wheel head is equipped with an adjusting motor for execution of the axial shift of the grinding worm. In those cases, where an arrangement for the execution of axial shiftings or shifting of the grinding worm already exists, the same motor may be used under certain circumstances. The signals for the execution of the shifting, however, would have to be changed in form depending on the tooth spacing.

In case of gear grinders which however are equipped with an electronically controlled positive movement arrangement, the corrective shifting may be accomplished by an additional rotational movement of the workpiece. Since electronic controls for positive movement for grinders for tooth flanks, as well as for hobbing millers, generally allow the workpiece to follow the tool, it will be effective in the present process to employ the pulses which are produced in response to the revolution of the workpiece are used for the determination of the corrective shifting. Since they correspond directly to a deviation of the angle or rotation, they may be fed directly into the electronic control system of the grinder.

It is furthermore possible to carry out a count of the workpiece teeth and gaps of the grinding worm which have actually moved past the two calibrated nozzles of the sensor unit by means of a counter, the counting limit of which corresponds to the desired number of tooth spacings for which the formation of the mean value for the corrective shifting $V_M$ is carried out. In case that the number of the counted teeth of the workpiece does not coincide with the number of the counted gaps of the grinding worm, swing-out of the sensor unit from the measuring zone and also the engagement of the grinding worm with the workpiece to be processed are blocked. The grinding cycle may not be started until the cause for the trouble, which usually is to be found in an incorrect selection of the distances of the measuring nozzles from the objects that are to be measured, i.e. from the workpiece and/or from the grinding worm, is rectified. The measuring process in this case is repeated continuously.

During depression of a started key for the beginning of the working cycle, the sensor unit may be moved automatically into the measuring zone, i.e. between the grinding worm and the workpiece, whereby the position of the three parts mentioned must be established at the first workpiece. The swing-out of the sensor unit from the measuring zone and the introduction of the grinding worm into the workpiece to be processed may take place automatically on command of above-mentioned counter.

An embodiment of an apparatus for implementing the described process in connection with positive electronic movement control of a tooth bevel grinder will be explained subsequently on the basis of FIGS. 3 and 4.

Figure 3:
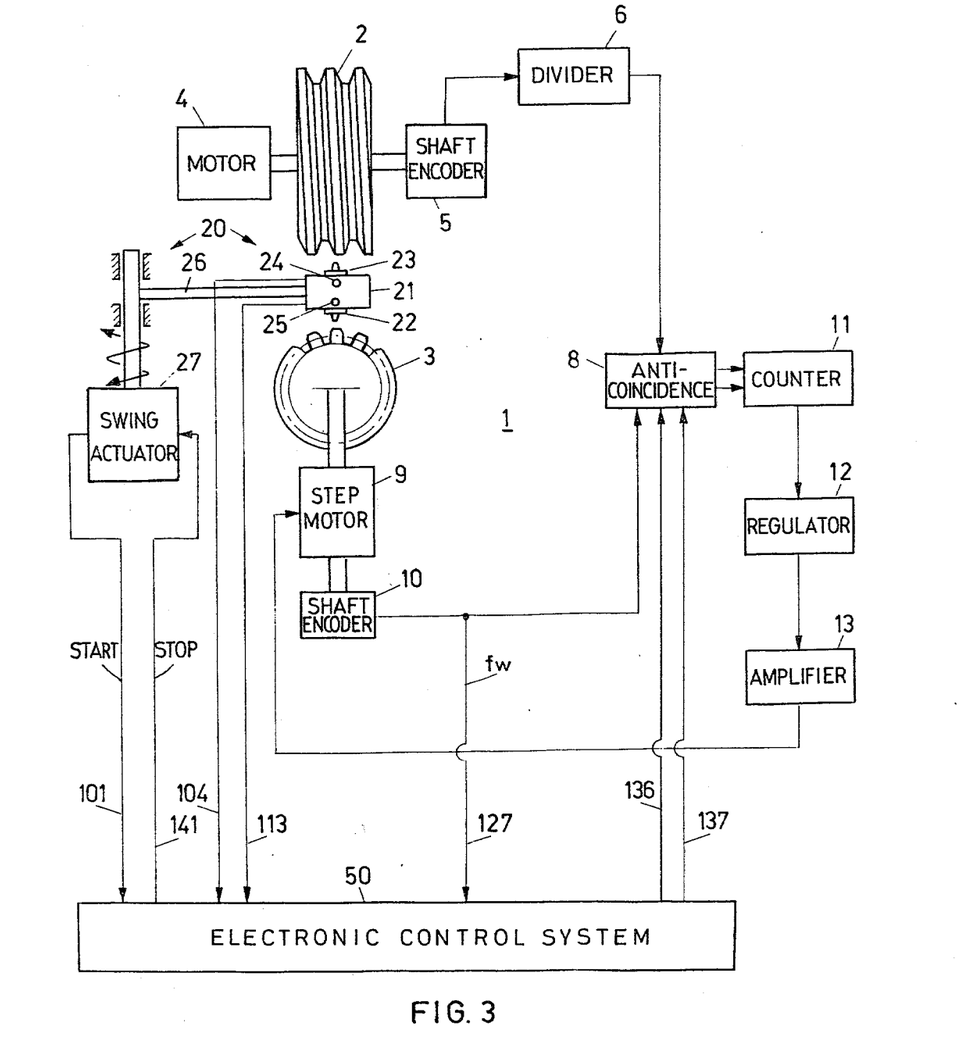
FIG. 3 shows schematically a gear tooth grinding machine with an electronic control circuit and an embodiment of the apparatus of the invention for the automatic control of the engagement of the grinding worm with the gear to be processed.

FIG. 3 illustrates as components of the grinder apparatus the above-mentioned electronic positive movement control 1 including a grinding worm 2 and of a gear-workpiece 3 to be processed, a measuring structure 20 and an electronic control system 50 of the present arrangement for the automatic engagement of the grinding worm 2 into the tooth spaces of the workpiece 3 to be ground.

The grinding worm 2 is driven by an electric motor 4. A shaft encoder 5 for determining the rotary angle of the grinding worm 2 is disposed on its shaft, the output pulses of which are fed to a divider 6. The outlet of the divider 6 is connected to the input of an anti-coincidence detector unit 8.

The workpiece 3 is actuated by a stepping motor 9 on the shaft of which an additional shaft encoder 10 is disposed. The output of the shaft encoder 10 is connected to an additional input of the anti-coincidence unit 8.

Two outputs of the anti-coincidence unit 8, delivering signals with different signs are connected to a balance counter 11, the output signal of which is fed to a regulator 12. The control signal produced by this device is fed via a power amplifier 13 to the stepping motor 9 for the controlled drive of the workpiece 3.

The measuring structure 20, provided in addition to the known positive movement control 1, includes a sensor unit 21 having a pneumatic differential pressure gauge, known per se, and a pair of nozzles for measuring the grinding worm 2 and the workpiece 3. Each of the two pairs of nozzles contains an adjustable reference nozzle 24, 25 and a measuring nozzle 22, 23. The sensor unit 21 is attached to a bracket 26 which may be swung in or out by means of which it is moved into the measuring zone between the grinding worm 2 and the gear-workpiece 3 upon a command for starting the processing action. After a completed measuring and correcting operation, the bracket 26 together with the sensor unit 21 attached to it, is given the command for swinging out of the measuring zone by a measuring counter 57, described later, which counts and monitors the number of the teeth of the workpiece and spaces of the grinding worm by which the mean value for the corrective shifting $V_M$ is determined. As a result of swinging the bracket 26 out, the command signal for moving in the workpiece 3, now being in the correct position, is given simultaneously to the grinding worm 2. A swing actuator 27 for swinging the bracket 26 in and out is provided. This may be a pneumatically operated rotary actuator the construction of which need not be described here as a number of such devices are readily commercially available and quite well known.

The electronic control system 50 is connected with the above-described units via several lines. One connecting line 101 is connected to the swing actuator 27 for swinging the holder 26 in and out and delivers a starting pulse to the control system 50 after the swinging in of the holder 26. Another connecting line 141 is likewise connected with the swing actuator 27 and delivers a command signal for swinging out of the holder 26 to the former. Two connecting lines 104 and 113 are connected to the sensor unit 21 and feed the measuring signals of the measuring nozzles 23 or 22 to the control system 50. One connecting line 127 is connected with the output of the shaft encoder 10 of the drive for the workpiece 3. Finally two more connecting lines 136 and 137 are connected with the anti-coincidence unit 8, and feed polarity-separated, i.e. directionally separated correctional signals to it.

Figure 4:
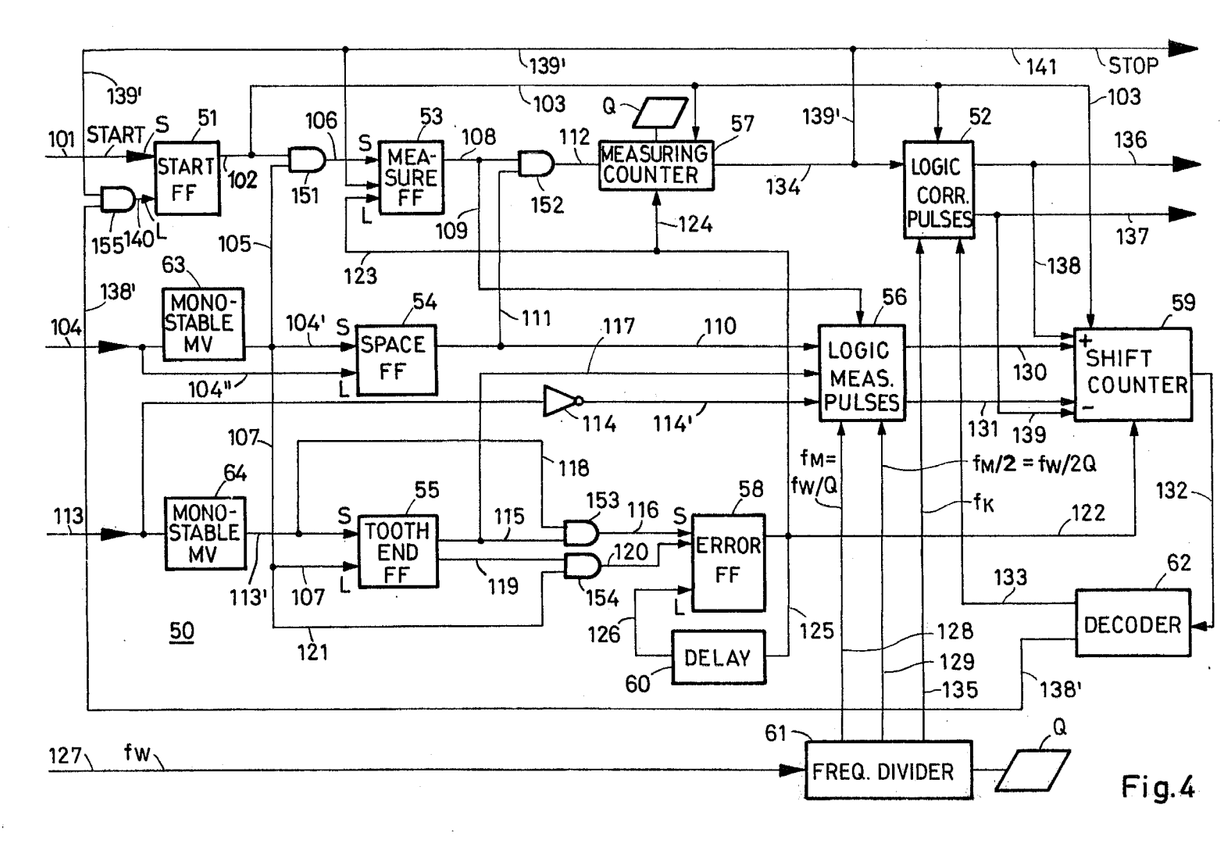
FIG. 4 shows a block diagram of an electronic circuit arrangement of the control arrangement of FIG. 3.
Figure 5:
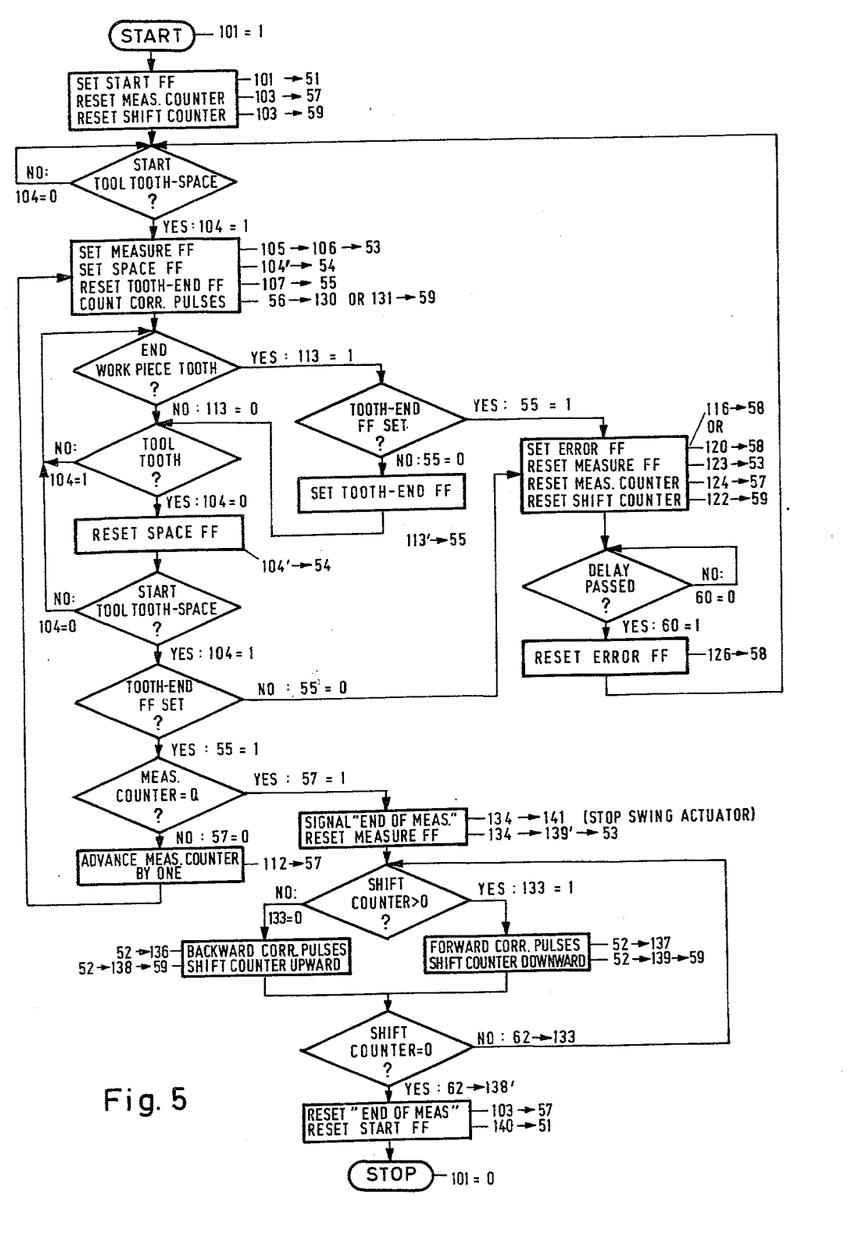
FIG. 5 is a flow diagram for the circuit arrangement of FIG. 4.
Figures 6, 6B:
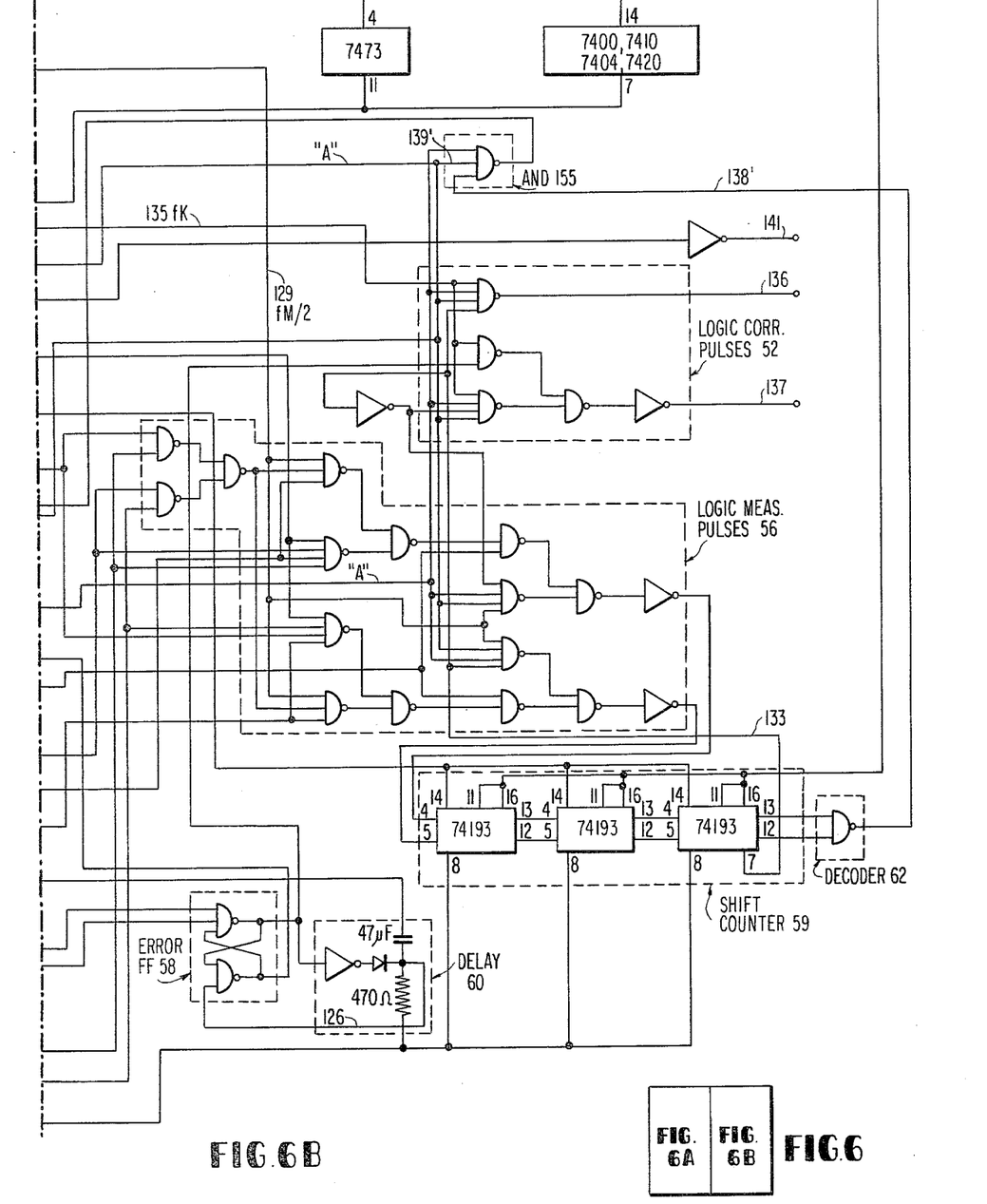
FIG. 6 is a showing of the orientation of FIGS. 6A and 6B.
FIGS. 6A and 6B are detailed logic diagrams of the circuit arrangement of FIG. 4.
Figure 6A:
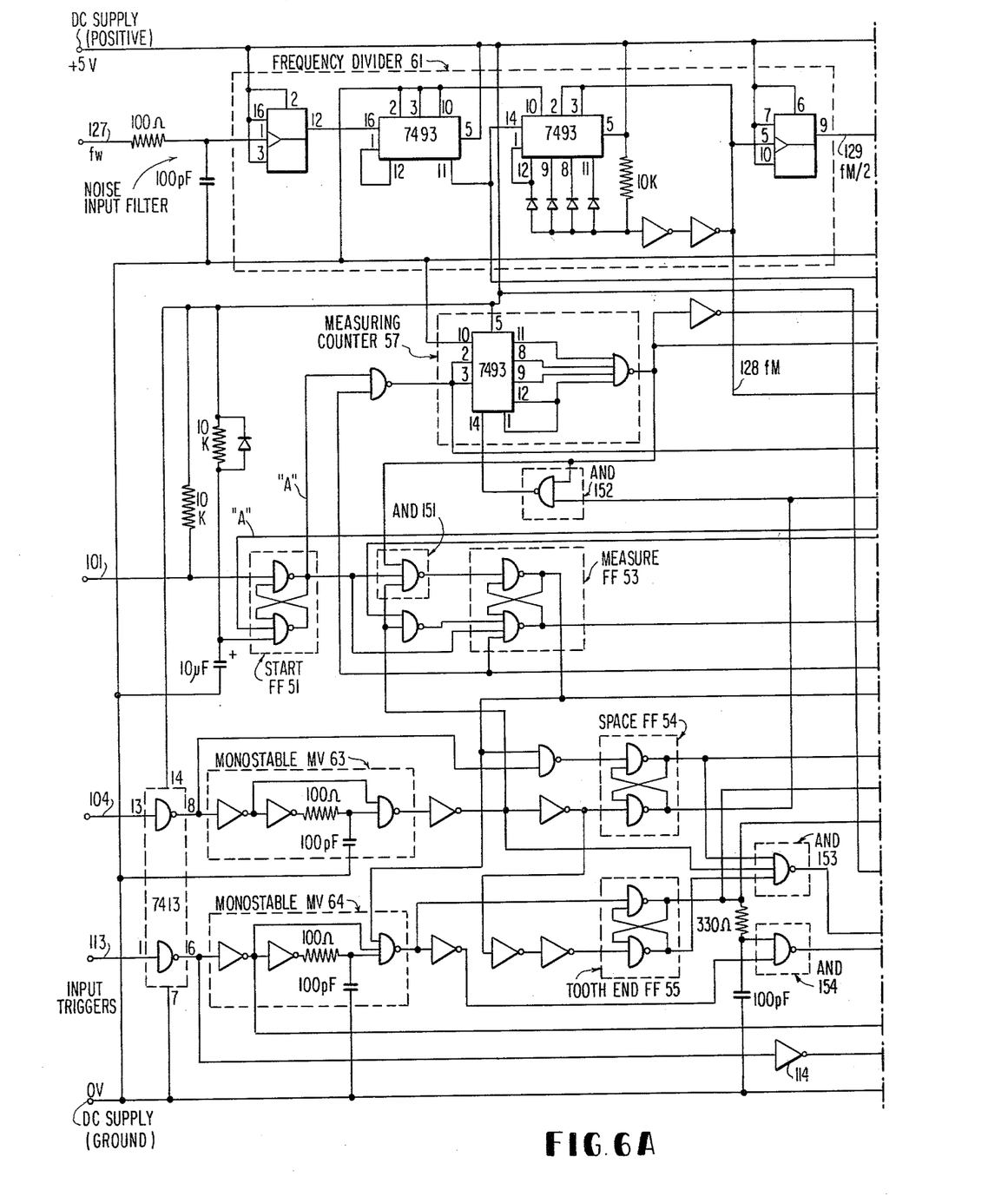

FIG. 4 shows a block circuit diagram of the electronic control system 50 of FIG. 3 in which the input and output lines are designated in correspondance with FIG. 3 and are indicated with large arrows. FIG. 5 is a flow diagram and FIG. 6 a detailed logic schematic of the system of FIG. 4. The following explanation of this circuit diagram is made on the basis of the description of functions in the course of a measuring and correcting process.

By way of a starting pulse which is fed from the grinder via the line 101 (FIG. 3), a starting flip-flop 51 is set, with which the arrangement is actuated or the measuring and correcting process begun.

From the starting flip-flop 51, the starting signal is fed via line 102 and line 103 and branched off from it to a first logic unit 52 which is provided for the production of corrective pulses and also via the same line to a measuring counter 57 and a shift counter 59, both described below, as a reset-to-zero signal. The same signal is also coupled to line 102 of a logical AND-gate circuit 151 for its control.

As soon as the starting point 0 of the first space $L_S$ of the grinding worm has been detected by the pertinent measuring nozzle 23 upon passage of the toothing of the grinding worm, a corresponding pulse signal which represents the reference point 0 of the measurement (FIGS. 1A to 1H), is delivered on line 104. This signal reaches the line 105 via a monostable circuit 63, which transforms the signal to a shorter pulse, and the set input S of a measuring flip-flop 53 via the opened gate of the logical AND-gate circuit 151 as well as the line 106, the setting inlet S of a space-flip-flop 54 of the grinding worm via the line 104', and the reset input L, of a tooth-end flip-flop 55 via a line 107, branched off from line 105. A by-pass line 104'' connects line 104 to the reset input L of the flip-flop 54 so as to reset that flip-flop as soon as the signal on line 104 disappears, thus indicating the beginning of a tooth of the grinding worm.

From the measuring flip-flop 53, the pulse signal representing the beginning of the space of the grinding worm is fed via a line 108 and a line 109, branched off from the former, to a second logic-unit 56 for measuring pulses. Simultaneously, the pulse signal is fed via the line 108, another logical AND-gate circuit 152 and a line 112 to the measuring counter 57. The counter 57 counts the number Q of workpiece teeth, which may be adjusted by way of which the measurements for forming the mean value for the corrective shifting $V_M$ are carried out.

The space flip-flop 54 is connected with the logic-unit 56 for the measuring pulses via a line 110. A line 111, branched off from line 110, leads to the logical AND-gate circuit 152.

Whenever now a signal, which indicates a space between two workpiece teeth, is delivered by the measuring nozzle 22, which is assigned to the workpiece, to the line 113 (FIG. 3), then this signal is fed via a monostable circuit 64 and a line 113' to the setting inlet S of the tooth-end flip-flop 55 and also via a line branched off from line 113, which includes an inverter 114, and a line 114', to the logic-unit 56 for the measuring pulses.

From the set tooth-end flip-flop 55, a line 115 leads to another logical AND-gate circuit 153 and from here via a line 116 to the setting input S of an error flip-flop 58 which serves for monitoring whether or not any one or two workpiece teeth are registered within a measuring cycle. The cycle always last from the beginning of the space of the grinding worm to the beginning of the next space of the grinding worm. Furthermore, the output of the tooth-end flip-flop 55 is connected with the logic unit for the measuring pulses via a line 117 branched off from line 115.

In order to determine whether more than one workpiece tooth is being registered within the measuring cycle mentioned, the pulse signals of the workpiece tooth-end are fed to the error flip-flop via the line 118 as well as via the logical AND-gate circuit 153, by-passing the tooth-end flip-flop 55, whereby the error flip-flop 58 is set simultaneously with the arrival of the pulse signal.

As long as no pulse signal which indicates the end of the workpiece tooth is delivered via the monostable circuit 64 by the measuring nozzle 22, which is assigned to the workpiece, the tooth-end flip-flop 55 remains reset because of the pulse signal initiated from the starting point of the space of the grinding worm. In this period, therefore, an additional logical AND-gate circuit 154 is opened via a line 119.

The pulse signals representing the beginnings of spaces of the grinding worm are fed to an additional set input of the error flip-flop 58 by line 121, branched off from the line 107, with which the tooth-end flip-flop 55 is by-passed, via the AND-gate circuit 154 and a line 120, where the pulse signals cause its setting.

Whenever no tooth or two teeth have been registered by the error flip-flop 58 within the measuring cycle, then the measurement is wrong, i.e. a shift-counter 59, which will be described subsequently, is reset via a line 122, the measuring flip-flop 53 is reset via a line 123 branched off from line 122, and the measuring counter 57 is reset via a line 124 branched off from line 123, so that the measurement may start again in a subsequent measuring cycle. The error flip-flop 58 itself is reset via a line 125, branched off from line 22 and which leads to a delaying unit 60, and from there via a line 126, which is connected with the reset input L of the error flip-flop 58.

The workpiece pulses with the frequency $f_W$, produced by the shaft encoder 10 of the workpiece 3, are fed via line 127 (FIG. 3) to a frequency divider 61, by which a division of said frequency $F_W$ is accomplished by the adjustable factor Q which may be an integer to 1 to n. Then measuring pulses with the measuring frequency $f_M = f_W/Q$ are fed from this frequency divider 61 via a line 128, and with half the measuring frequency $f_M/2$ via a line 129 to the logic unit 56 for the measuring pulses.

The shift counter 59 with its two inputs, marked by + and − for plus measuring pulses or minus measuring pulses, is connected to two outputs of the logic unit 56 for the measuring pulses via lines 130 and 131. The generation of measuring pulses, arriving on the lines 128 and 129 in the logic-unit 56, to the shift counter 59, takes place according to the signals present on the additional inlet lines 110, 114, 117 of the logic-unit 56, in accordance with the following logic table of the logic unit 56 which corresponds to the previously given counting pattern of measuring pulses.

| Measurement | | $\overline{\text{tooth}}$ and tooth end − FF | tooth and tooth end − FF | $\overline{\text{tooth}}$ and tooth end − FF | tooth and tooth end − FF |
|---|---|---|---|---|---|
| SS | Space | $-\dfrac{f_M}{2} \rightarrow VZ$ | | $+\dfrac{f_M}{2} \rightarrow VZ$ | $+f_M \rightarrow VZ$ |
| | $\overline{\text{Space}}$ | $-f_M \rightarrow VZ$ | $-\dfrac{f_M}{2} \rightarrow VZ$ | | $+\dfrac{f_M}{2} \rightarrow VZ$ |

In this table:
SS: stands for "grinding worm"
tooth: a tooth of the workpiece is detected, i.e. a signal is present on line 114' (in view of inverter 114)

tooth: there is no tooth of the workpiece detected, i.e. no signal is present on line 114' (in view of inverter 114)

tooth-end-FF: the tooth-end flip-flop 55 is set, and a signal is present on line 117 tooth-end FF: the tooth-end flip-flop 55 is reset and there is no signal present on line 117 space: the space flip-flop 54 is set, and there is a signal present on line 110 space: the space flip-flop 54 is erased and there is no signal present on line 110

$f_M \rightarrow VZ$ etc.: measuring pulses with the frequency $f_M$ are fed to the shift-counter VZ via the line 130 (+) or 131 (−).

The plus and minus measuring pulses algebraically are summed within each measuring cycle which lasts, as already mentioned, from the starting point 0 of a space $L_S$ of the grinding worm to the starting point of the next space $L_S$ of the grinding worm. The summed pulses are fed from the shift counter 59 as the content of the counter $J_Z$ via a line 132 to a decoder 62, whereby in the case $J_Z>0$ or $\overline{J_Z}>0$, i.e. in the case that the content of counting is different from 0, the counter content $J_Z$ is forwarded via a line 133 to the unit 52 for the corrective pulses. The case $J_Z=0$ will be explained below.

Upon receipt of the "end of measurement" signal by the counter 57 which is delivered via a line 134 to the corrective pulse logic-unit 52, after passage of Q toothspaces, corrective pulses are produced by the logic-unit 52 using pulses with the correction frequency $f_K$ from the frequency divider 61 via a line 135. The value of the frequency $f_K$ of the corrective pulses is fixed with due consideration of the dynamics of the correcting arrangement on the grinder for tooth flanks, since the latter must be able to obey the corrective pulses. In practice, the frequency may be about 1000 Hz.

The formation of the mean value takes place automatically during the counting of the measuring cycles, since division by the number of measuring cycles required for the formation of mean values has been taken into consideration during summation since the division of the frequency $f_W$ of the workpiece pulses takes place by the factor Q, i.e. the number of workpiece teeth. Since the number of teeth of the workpiece is considerably smaller than the number of pulses of the workpiece, this formation of mean values is sufficiently accurate.

Negative corrective pulses, which cause a forward movement of the workpiece 3, are introduced from the logic unit 52 for the corrective pulses on a line 136 and positive corrective pulses, which cause a backward directed rotary movement of the workpiece 3, on the line 137 into the existing control system of FIG. 3 of grinding worm 2 and workpiece 3.

The negative corrective pulses are fed via a line 138, branched off from line 136, and the positive corrective pulses via a line 139 branched off from line 137, to the positive or negative input of the shift counter 59 for the purpose of resetting the shift counter by pulses up to 0.

The logic-unit for the corrective pulses operates according to the following logic pattern. For the start and end of the measurement (signals on lines 103 and 134): $J_Z>0$ (starting signal on line 133). The shift counter 59 then counts downward with the correction frequency. For $\overline{J_Z}>0$ (no starting signal on line 133), the shift counter 59 counts upward with the correction frequency.

Whenever the counter content determined in the shift counter 59 is $J_Z=0$, then a corresponding signal is delivered by the decoding unit 62 via the line 138 to the logical AND-gate circuit 155. Whenever such a signal originates within a single measuring cycle, that is within a tooth space, then nothing at all will happen. The AND-gate circuit 155 releases the signal for resetting the starting flip-flop 51 only in case of the simultaneous arrival of the "end of measurement" signal fed in on a line 139, branched off line 134, via a line 140, which is connected to the reset input of the starting flip-flop 51. The "end of measurement" signal, however, will be delivered by the measuring counter 57 only after complete passage of the selected number of Q tooth spaces or number of Q tooth spaces adjusted by the measuring counter 57 controlled by the error flip-flop 58. After the "end of measurement" signal however the shift counter 59 is reset to zero by the corrective pulses as described earlier so that a corresponding signal is fed into the logical AND-gate circuit 155 via line 138.

The "end of measurement" signal is fed to the swing actuator 27 for the swinging in and out of the holder 26 on which the sensor unit 21 is attached via the line 141 and branched off from line 139. The resetting of the shift counter 59 preferably takes place as a result of the corrective pulses during the swinging out operation since the electric, positive action control, explained on the basis of FIG. 3, is sufficiently fast, to accomplish any correction during the swinging out. Whenever another correcting arrangement than an electric one is provided, then the two processes must be staggered in time. After the swinging out, the actual grinding process, i.e. the moving in of the grinding worm 2 into the workpiece 3 which now is in the correct position in regard to the former may be started. With regard to FIG. G, the integrated circuit number specified are all Texas Instruments, Inc. types.

What is claimed is:

1. A gear processing grinder controlled by positive movement and operating according to the screw rolling process in which a rotating tool is controlled in its movement prior to engagement with the preprocessed toothing of a workpiece gear rotating at a predetermined rate in relation to the tool, the improvement being characterized by a sensor which may be moved between the tool and the workpiece during the running of said tool or workpiece prior to engagement of the tool and workpiece, said sensor having at least one pair of nozzles for the tool and the workpiece for the pneumatic measurement of differential pressure, whereby each pair of said nozzles comprises an adjustable reference nozzle and a measuring nozzle alignable with the tool or the workpiece, means for producing an electric signal corresponding to the measured differential pressure, by a recognition circuit coupled to the measuring nozzles for recognizing the spaces of the tool and teeth of the workpiece moving past the calibrated nozzles, a first logical circuit coupled to the recognition circuit, switching means coupled to the logical circuit for the production of measuring pulses the frequency of which is higher than the frequency of successive tooth or speed spacings, a counter for the algebraic summation of the measuring pulses by the logical circuit in dependence on the output signals of the recognition circuit connected to the output of the first logical circuit and, a second logical circuit for producing corrective signals in forward and backward direction produced in accordance with content of the counter.

2. The apparatus as in claim 1, characterized in that the sensor is disposed on a swiveled holder.

3. The apparatus as in claim 1, characterized in that the switching means for the production of the measuring pulses contains an adjustable divider the input of which is coupled to a source of pulses, the frequency of which depends on the rotational speed of the workpiece.

4. The apparatus as in claim 1, characterized in that an adjustable counter connected to the recognition circuit for the spaces of the tool is provided for the determination of the number of tooth and speed spacings from which the measurement and the mean value is determined, whereby the output of the counter is connected with an input of the second logical circuit.

5. The apparatus as in claim 1, characterized in the provision of an error counter, coupled to an input of the measuring nozzles which produces an output signal for blocking the sensor in a position between the tool and the workpiece and for the repetition of the measurement in case of non-agreement of the number of the workpiece teeth and tool spaces running past the measuring nozzles.

6. The apparatus as in claim 1, characterized in that the output of the second logical circuit is connected with the input of the counter for the measuring pulses for resetting the counter to zero with the corrective signals.

* * * * *